United States Patent
Oberheim

(10) Patent No.: US 8,230,608 B2
(45) Date of Patent: Jul. 31, 2012

(54) PROGRESSIVE FORCE CUT PATH DRIVE MECHANISM FOR A RECIPROCATING TOOL

(75) Inventor: Stephen C. Oberheim, Des Plaines, IL (US)

(73) Assignee: Robert Bosch GmbH, Stuttgart (DE)

( * ) Notice: Subject to any disclaimer, the term of this patent is extended or adjusted under 35 U.S.C. 154(b) by 940 days.

(21) Appl. No.: 12/256,912

(22) Filed: Oct. 23, 2008

(65) Prior Publication Data

US 2010/0101101 A1    Apr. 29, 2010

(51) Int. Cl.
*B27B 3/12*      (2006.01)
*B27B 19/09*    (2006.01)

(52) U.S. Cl. .............................. 30/393; 74/25
(58) Field of Classification Search ............ 30/393, 30/392, 394, 501–503, 208–214, 503.5, 220–226; 74/50, 55, 56, 57, 58; 83/646–647, 647.5; 173/176; 464/182
See application file for complete search history.

(56) References Cited

U.S. PATENT DOCUMENTS

| | | | |
|---|---|---|---|
| 2,619,131 A | | 11/1952 | Vulliet-Durand |
| 2,619,133 A | * | 11/1952 | Vulliet-Durand ............... 30/393 |
| 2,630,148 A | * | 3/1953 | Ferguson ........................ 30/393 |
| 2,793,661 A | | 5/1957 | Olson |
| 4,038,721 A | | 8/1977 | Kendzior |
| 4,238,884 A | | 12/1980 | Walton, II |
| 4,550,501 A | | 11/1985 | Moores, Jr. et al. |
| 5,450,925 A | | 9/1995 | Smith et al. |
| 5,555,626 A | | 9/1996 | Fuchs |
| 6,234,255 B1 | | 5/2001 | Feldmann et al. |
| 6,249,979 B1 | | 6/2001 | Bednar et al. |
| 6,282,797 B1 | | 9/2001 | Osada et al. |
| 6,508,151 B1 | | 1/2003 | Neitzell |
| 6,634,107 B2 | | 10/2003 | Osada |
| 6,662,455 B2 | | 12/2003 | Tachibana et al. |
| 6,742,267 B2 | | 6/2004 | Marinkovich et al. |
| 6,758,119 B1 | | 7/2004 | Neitzell |
| 6,829,831 B1 | | 12/2004 | Neitzell |
| 7,096,590 B2 | | 8/2006 | Marinkovich et al. |
| 7,117,601 B2 | | 10/2006 | Hai-Chun |
| 7,181,850 B2 | * | 2/2007 | Tachibana et al. ............... 30/393 |
| 7,188,425 B2 | | 3/2007 | Bednar et al. |
| 7,350,302 B2 | | 4/2008 | Imai et al. |
| 2004/0040162 A1 | | 3/2004 | Osada |
| 2005/0178012 A1 | * | 8/2005 | Neitzell et al. ................... 30/392 |
| 2005/0262710 A1 | * | 12/2005 | Moreno ............................ 30/394 |
| 2008/0189961 A1 | * | 8/2008 | Oberheim ......................... 30/393 |

* cited by examiner

*Primary Examiner* — Ghassem Alie
(74) *Attorney, Agent, or Firm* — Greer, Burns & Crain, Ltd.

(57) ABSTRACT

A drive apparatus for a reciprocating tool includes a housing, a rotatable drive shaft assembly located in the housing, and an elongated plunger located in the housing for a reciprocating motion. The plunger has a front end portion for attaching a cutting blade thereto. The drive apparatus also includes a rotary joint elongated rocker having a lower end portion with a lower pivot connection to the housing and an upper end with an upper pivot connection to a mid portion of the plunger. A wobble plate interface is operatively connected to the drive shaft assembly, a lower portion having an effective lower pivot connection. The wobble plate interface also has an upper pivot connection to a rear portion of the plunger and configured to reciprocate the plunger generally in its lengthwise direction during alternating cutting and return strokes.

12 Claims, 5 Drawing Sheets

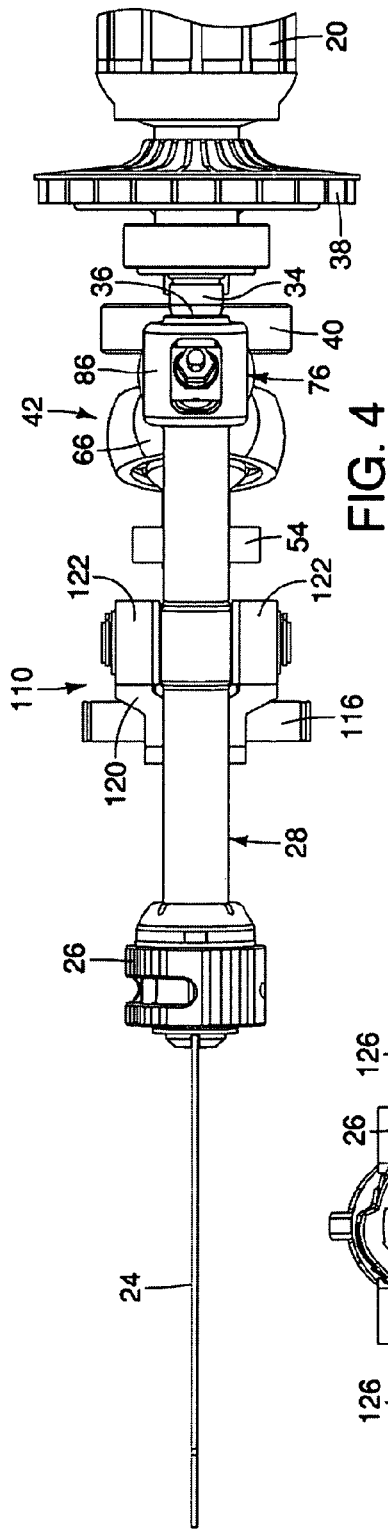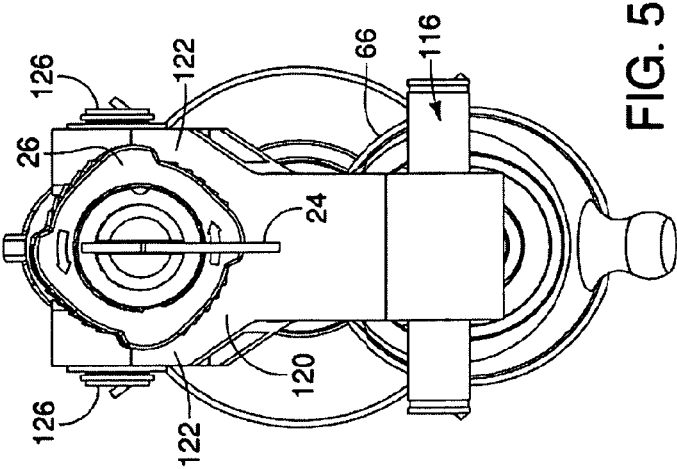

PROGRESSIVE FORCE CUT PATH DRIVE MECHANISM FOR A RECIPROCATING TOOL

BACKGROUND OF THE INVENTION

The present invention generally relates to power hand tools, and more particularly, to power reciprocating tools.

Reciprocating tools that are motor driven, such as saber saws, larger reciprocating saws and the like are usually driven by electric motors that have a rotating output shaft. The rotating motion is translated into reciprocating motion for moving a saw blade or the like in a reciprocating manner.

Reciprocating tools such as jigsaws, saber saws, as well as larger reciprocating saws are typically driven by the rotating output shaft of an electric motor. Such tools have a mechanism that translates rotary motion of the output shaft into reciprocating motion among the types of mechanisms that convert the rotary motion to reciprocating motion includes a wobble plate drive mechanism that is well known to those of ordinary skill in the art.

There has been much research and development over the years in attempting to improve the cutting efficiency of such reciprocating saws and this has been achieved by introducing an orbital path of movement for the blade as it performs its cutting stroke as well as its return stroke. Such orbital as have the effect of increasing the force that is applied to the blade during its cutting operation. The amount of orbital action can often be varied by manipulation of a control mechanism associated with the tool, so that efficient cutting can be done. The adjustment of the amount of orbital action or variation of the cut path can be made to more efficiently cut both hard and soft materials. It is generally known that existing orbit systems work better in soft materials than they do in hard materials. For this reason, saws are provided with orbit on-off switches. Knowing when to turn the orbital action on or off and remembering to do so can lead to confusion by users.

Existing orbit mechanisms create a motion path that is related to the position of the plunger. The position of the plunger or plunger rod can be described as being fully forward, fully back or at mid stroke in general. All existing orbit mechanisms cause the blade to start moving into the workpiece at the start of a cut stroke and move away from or out of the workpiece during the return stroke. The amount of incremental orbit motion in typical commercially marketed orbit systems is nearly constant during the entire cut stroke and the return stroke. The orbit path also can be said to be nearly symmetrical with respect to the cutting and return strokes.

These conventional orbit systems work well when cutting soft materials such as wood. However, when cutting hard materials such as steel, pipe or steel plate, conventional orbit systems have important drawbacks. Conventional orbit mechanisms apply orbital action at the start of a cut stroke. The orbital action often causes the blade to bounce on the material at the beginning of the cut stroke which delays good establishment of the blade teeth in the material for a portion of the cut stroke thereby reducing cutting effectiveness.

Mechanisms that can create substantial nonlinear orbit paths for aggressive orbit paths and end strokes with conventional orbit drive systems have often experienced significant mechanical limitations. These are typically cam systems that have linear motion which is basically symmetric about a midstroke position, with the cut stroke being one near linear path and the return stroke as another near linear path. These two paths are offset from each other by a small amount.

To date, no known attempts have been made to create asymmetric or to create highly nonlinear paths. Attempts have been made to create a more aggressive orbit using cam drives. However, this results in very high cam follower loads which create high friction and wear in the cam elements. Another wear problem that occurs when the cam is aggressively shaped is that the cam follower can lift off of the cam. This produces a lack of contact between the cam and the cam follower for a major portion of the cam rotation. This is called cam float and is a common problem in high-speed cams. Floating results in loss of the force pushing the blade into the work piece. In especially aggressive cams, it can require several revolutions of the cam before the follower comes back down into contact with it. The loss of cam to cam follower contact then leads to the loss of contact force between the saw blade and the workpiece and reduces the cutting rate instead of increases it.

There have been cam systems where the orbit actuation cycle of down and up is shared by two cams. However, having aggressively shaped cams is expensive because of the necessity of matching two cam profiles with a high degree of precision and the attendant wear problem still exists. Similar problems of high forces arising with aggressive orbits arise when trying to use adjustable angled slots with their associated slot followers. The forces that are experienced can be very high, even if the track is straight and too much orbital action will lead to high forces on the track follower. Since much of the action of a track follower involves sliding, high friction and wear are also a problem.

SUMMARY OF THE INVENTION

One preferred embodiment of the present invention is a drive apparatus for a reciprocating tool, that comprises a housing, a rotatable drive shaft assembly located in the housing, an elongated plunger located in the housing for reciprocating motion, the plunger having a front end portion for attaching a cutting blade thereto, a rotary joint elongated rocker having a lower end portion with a lower pivot connection to the housing and an upper end with an upper pivot connection to a mid portion of the plunger, a wobble plate interface operatively connected to the drive shaft assembly, a lower portion having an effective lower pivot connection, the interface also having an upper pivot connection to a rear portion of the plunger and configured to reciprocate the plunger generally in its lengthwise direction during alternating cutting and return strokes, the distances between the upper and lower pivot connections of both the rocker and wobble plate interface together with the distance between the upper pivot connections thereof to the plunger defining a four bar mechanism that produces a path of movement of an attached cutting blade that is effective to apply a progressive non-linear cutting force to a workpiece during the cutting stroke.

DESCRIPTION OF THE DRAWINGS

FIG. 4 is a top view of the drive mechanism shown in FIG. 2;

FIG. 5 is a front in view of the drive mechanism shown in FIG. 3;

DETAILED DESCRIPTION

The preferred embodiments of the present invention are reciprocating drive mechanisms for a reciprocating tool such as a reciprocating saw, the general size and shape of which is similar to saws that are currently marketed. The present invention is also applicable for other types of tools such as saber saws, for example, or other types of tools that have a reciprocating action and are powered by a motor having a rotating output shaft.

A preferred embodiment of the present invention provides a reciprocating drive mechanism that utilizes a progressive nonlinear cut path as opposed to a traditional orbital path. The progressive cut path does this by using a nonlinear cut path that starts each cut with little contact force or a slightly negative contact force due to the blade lifting out of the workpiece in which it is engaged and then applies a gradually increasing contact force through the cutting stroke. This prevents bouncing on hard materials at the beginning of the cut stroke and allows the blade teeth to establish good engagement with the material. Then the contact force is increased through the mid-stroke to approximately one third of its maximum value. Toward the end of the cutting stroke, as the plunger is slowing down as part of its sinusoidal cycle, the cut stroke is more aggressively increased to its full value. The aggressive increase of the cut stroke at the end of the cut stroke makes better use of a portion of the cutting cycle where there is usually a drop off in cutting due to the fact that the plunger is slowing down.

So this type of nonlinear path improves the action of the cutting stroke by reducing bouncing of the blade on the workpiece at its beginning because it has very little contact force initially. Also, at the end of the cut stroke, embodiments of the present invention compensates for a slowing plunger with an aggressive cutting path.

The above operability is carried out using a drive mechanism that has far fewer parts and improved durability compared to existing mechanisms that provide orbital action. The progressive nonlinear motion is created by the action of a coupler link and a four bar mechanism that does not have any sliding interaction of components of the type which experiences wear and generates energy consuming heat.

Figure 1:
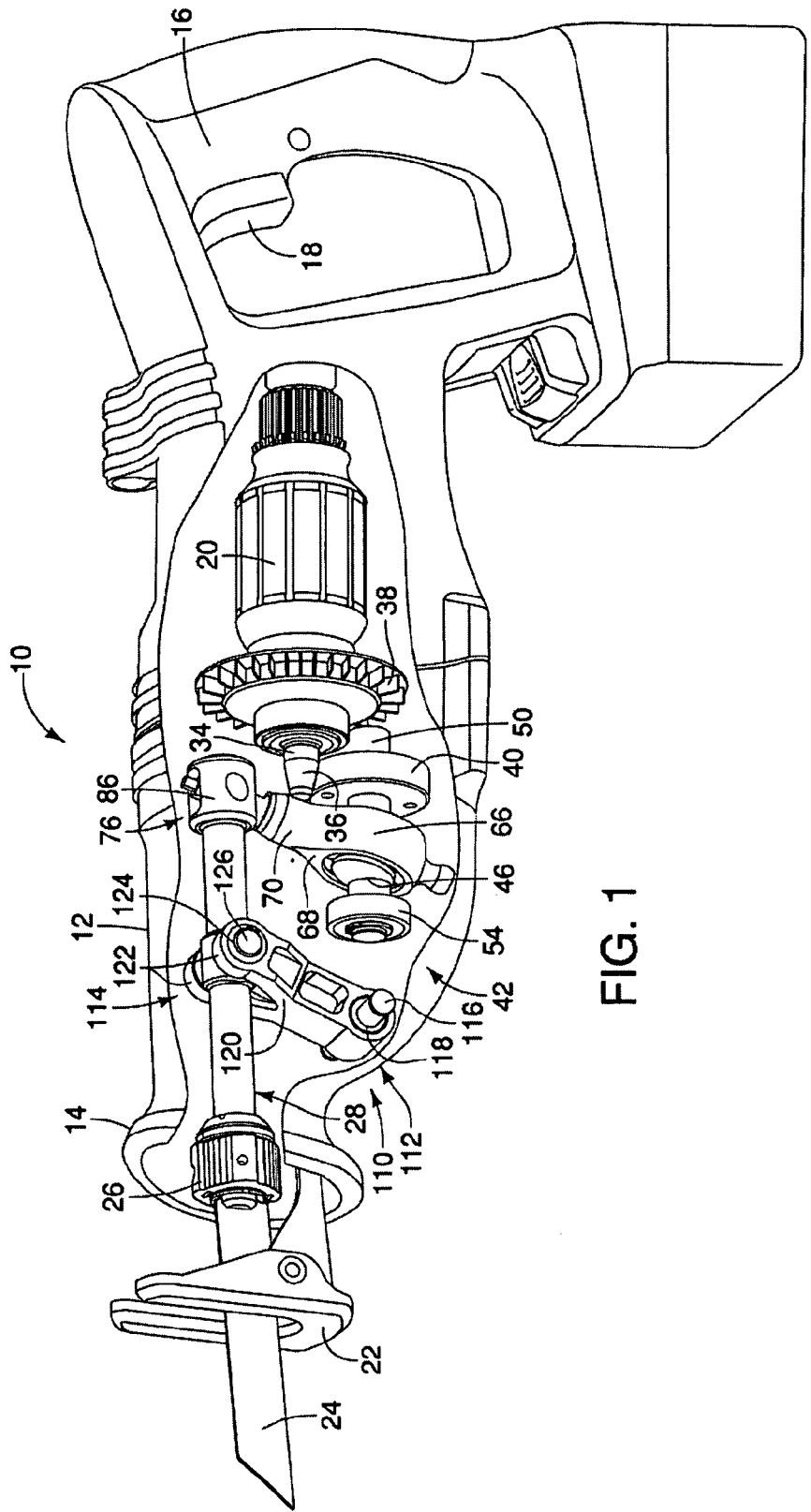
FIG. 1 is a perspective view of the preferred embodiment of the present invention, shown with portions removed to illustrate the drive mechanism.

Turning now to the drawings, and referring to FIG. 1, a reciprocating saw, indicated generally at 10, has a housing 12 which includes a nose portion 14 that is flared outwardly so that a user can hold the nose portion with one hand while holding a handle 16 with the other. A trigger switch 18 is provided in the handle portion 16 for turning on a motor 20 that drives the tool. The saw has a shoe 22 at the nose end portion 14 and a saw blade 24 is mounted in a blade clamping mechanism 26 that is mounted at the end of an elongated plunger, indicated generally at 28. As shown in FIGS. 1-4, the motor 20 has an output shaft 34 with a pinion gear 36 and fan member 38 operatively attached to the shaft 34, with the gear 36 engaging a larger gear 40 that is connected to a wobble plate assembly, indicated generally at 42, which drives the plunger 28 in a reciprocating manner. The teeth of the pinion gear 36 and gear 40 are not shown for the sake of simplicity, but are conventional as is known to those of ordinary skill in the art.

More particularly, the wobble shaft assembly 42 has a drive shaft, indicated generally at 46, to which the gear 40 is attached. The shaft has an end portion that is supported in a needle bearing 50 or the like and an opposite end supported in another ball bearing 54 that is mounted in the housing 12. It should be understood that the manner in which the motor 20, gears 36 and 40 as well as the shaft 46 are mounted in the housing 12 is not shown in detail inasmuch as such is conventional and is also well known to those of ordinary skill in the art.

Figure 2:
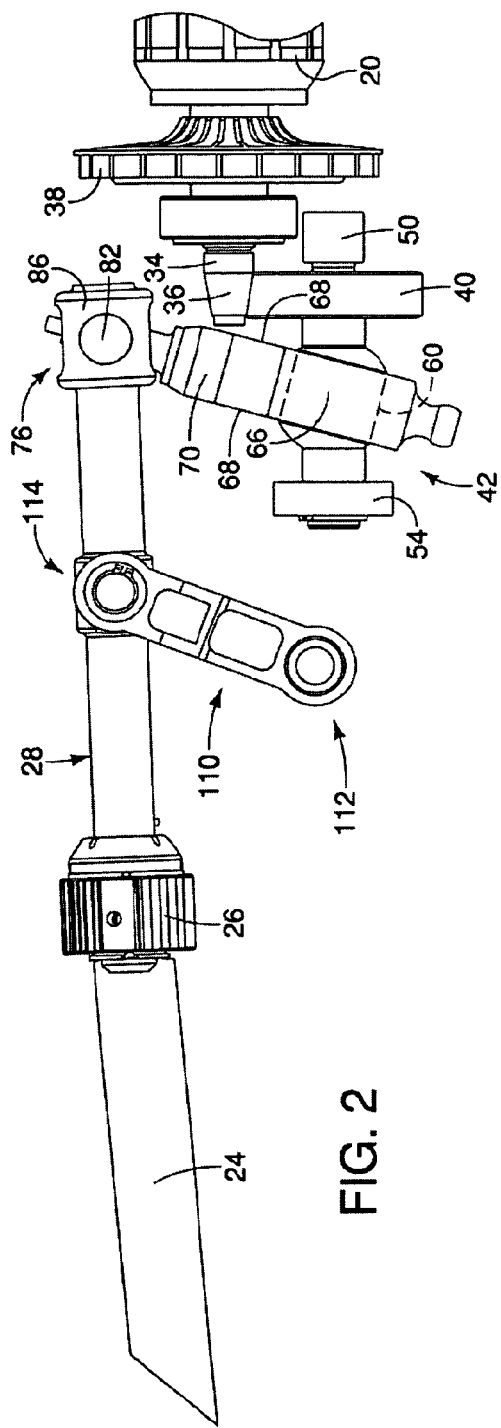
FIG. 2 is a plan view of the drive mechanism shown in the embodiment of FIG. 1, shown in a position at the end of a cutting stroke.
Figure 3:
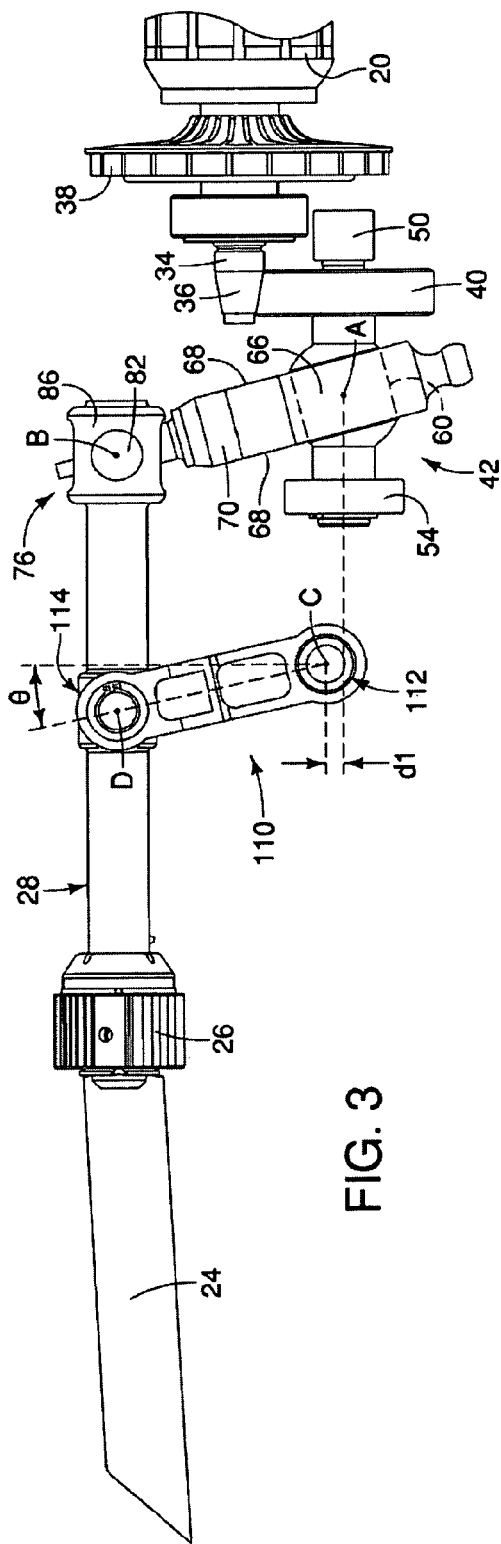
FIG. 3 is a plan view of the drive mechanism shown in the embodiment of FIG. 1, shown in a position at the beginning of a cutting stroke.

With regard to the wobble plate assembly 42, for and referring to FIGS. 1-3, the shaft 46 has generally cylindrical shaped portion 60 shown in phantom in FIGS. 2 and 3 that is oriented at an acute angle relative to the axis of the shaft 46. The wobble plate assembly 42 has an elongated arm 66 that is mounted in ball bearings (not shown) for rotation relative to the cylindrical portion 60, which permits the arm 66 to move in a left and right direction relative to the cylindrical portion 60 as the shaft 46 is rotated during operation.

More particularly, as the shaft 46 is rotated, the angular orientation of the cylindrical portion 60 changes, and an arm 66 of the wobble plate assembly 42 is moved in a reciprocating manner, i.e., to the left as shown in FIG. 3, and to the right as shown in FIGS. 1 and 2. As is best shown in FIG. 1, the arm 66 has generally flat sides 68 that extend from the bottom upwardly which then merges into a curved outer end member 70 that reduces in size and becomes circular shaped in cross-section.

Figure 8:
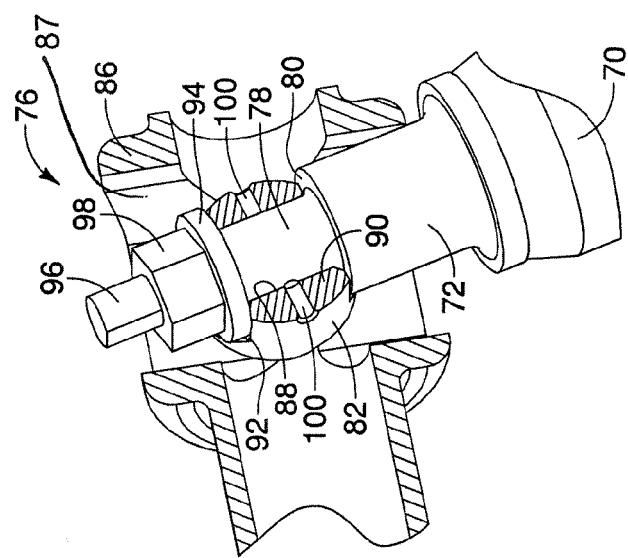
FIG. 8 is another perspective view of a portion of the drive mechanism, particularly illustrating another cross-section of the pivot connection shown in FIG. 6.
Figure 7:
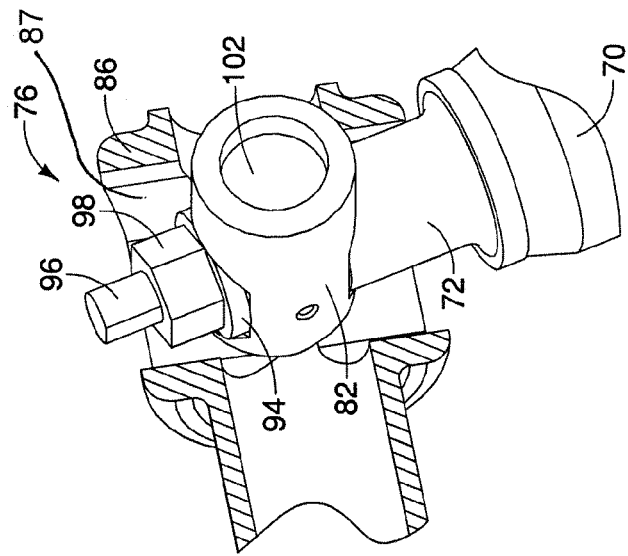
FIG. 7 is another perspective view of a portion of the drive mechanism, particularly illustrating a cross-section of the pivot connection shown in FIG. 6.
Figure 6:
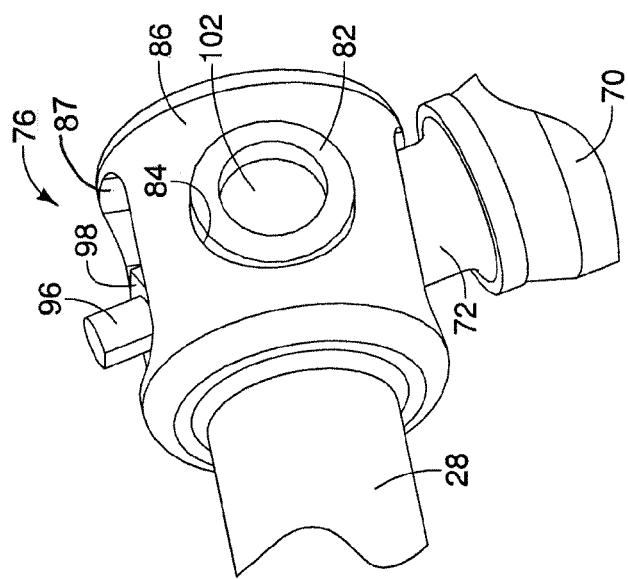
FIG. 6 is a perspective view of a portion of the drive mechanism, particularly illustrating the pivot connection of the wobble drive assembly and the plunger.

The end member 70 transitions into a cylindrical end portion 72 which connects to the plunger 28 by a pivot connection, indicated generally at 76, which is shown in FIGS. 6, 7 and 8, with FIGS. 7 and 8 being cross sections taken through the plunger 28 and portions of the pivot connection 76. The cylindrical portion 72 interfaces with a smaller diameter cylindrical portion 78 which forms an annular shoulder 80. A transverse cylindrical shaft 82 fits within an aperture 84 in the side walls of a receiver 86 that is formed or securely fixed to the rear end portion of the plunger 28. The receiver 86 also has a recess 87 that is vertically oriented in which the portions 72 and 78 can be inserted. The cylindrical shaft 82 is horizontally oriented and is configured to rotate in the aperture 84 during reciprocating motion of the plunger and arm 66 of the wobble plate assembly 42.

The cylindrical shaft 82 has a circular aperture 88 that is generally vertically oriented as shown in FIG. 8 and is sized to receive the cylindrical portion 78. The bottom of the cylindrical shaft 82 has a flat surface 90 which contacts the shoulder 80, and it also has an upper flat surface 92 that is configured to receive a washer 94, with the upper end 96 of the cylindrical portion 78 being threaded to receive a nut 98 thereon.

From the foregoing description, it should be appreciated that when the wobble plate assembly 42 reciprocates the arm 66 to the left and the right, the pivot connection 76 not only supports the rear end of the plunger 28, it enables the plunger to be driven by the wobble plate assembly 42 during operation. While not essential, small holes 100 may be provided for the purpose of introducing lubricating grease or the like into the cylindrical shaft 82 and its interface with the cylindrical portion 78. Also, while not essential, the opposite ends of the cylinder 82 may be formed or machined to provide a recess 102 for the purpose of reducing the weight of the cylinder 82.

The plunger 28 is also supported near its midpoint by an elongated rocker, indicated generally at 110, which has a lower pivot connection, indicated generally at 112, as well as an upper pivot connection, indicated generally at 114. The lower pivot connection 112 consists of a shaft 116 that is preferably secured in suitable recesses of the housing with the shaft 116 having needle bearings 118 enabling the low friction rotational movement of the elongated rocker. The rocker 112 has a split upper end 120 with two side portions 122, each of which has a needle bearing 124 in which a shaft 126 that is attached to the plunger 28 can rotate. It should be understood that the shaft 126 may actually be a unitary shaft that extends through the plunger 28, or there may be shaft portions which extend from each side of the plunger. In any event, the pivot connections enable the plunger to be reciprocated when driven by the wobble plate assembly 42.

Referring particularly to FIG. 3, it has been provided with letter designations identifying the center point of pivot connections of the wobble plate assembly 42 and the front rocker 110. More particularly, the center of the pivot connection at the base of the wobble plate assembly is identified as A whereas the center of the pivot connection 76 is marked B. Similarly, the pivot connection 112 has its center marked C and the center of the upper pivot connection 114 is marked D. As is evident from the drawing, the center C is slightly above the center A by distance d1 has been marked on the drawing. Also, on FIG. 3, the rocker 110 is shown in its furthest left position which orients the rocker slightly forward by an angle θ relative to top dead center. It can be appreciated that if the mechanism is reciprocated to the right so that the rocker 110 is straight up, i.e., top dead center, the elevation of the cutting blade 24 will be at its maximum. When it is moved completely to the left as shown in FIG. 3, it is then going to be slightly lower than its top dead center elevation position. Similarly, if it is moved to the right as shown in FIG. 2, the elevation of the rocker point B will decrease and this displacement during a cutting and return stroke is shown in the chart on FIG. 9.

As is evident from the chart, the blade height of zero is defined as when it is in the position shown in FIG. 3. When it is moved to the right moved approximately 6 or 7 millimeters it will be at its top dead center position. The complete cutting stroke is approximately 28 millimeters. After it has moved through top dead center, it is progressively moved in a non-linear way so that the blade force is increased as the plunger is moved through its cutting stroke. In this regard, the cutting stroke is from the left to right as shown in FIGS. 1-3 and the return stroke follows the same path as the plunger is moved to the left.

Figure 9:
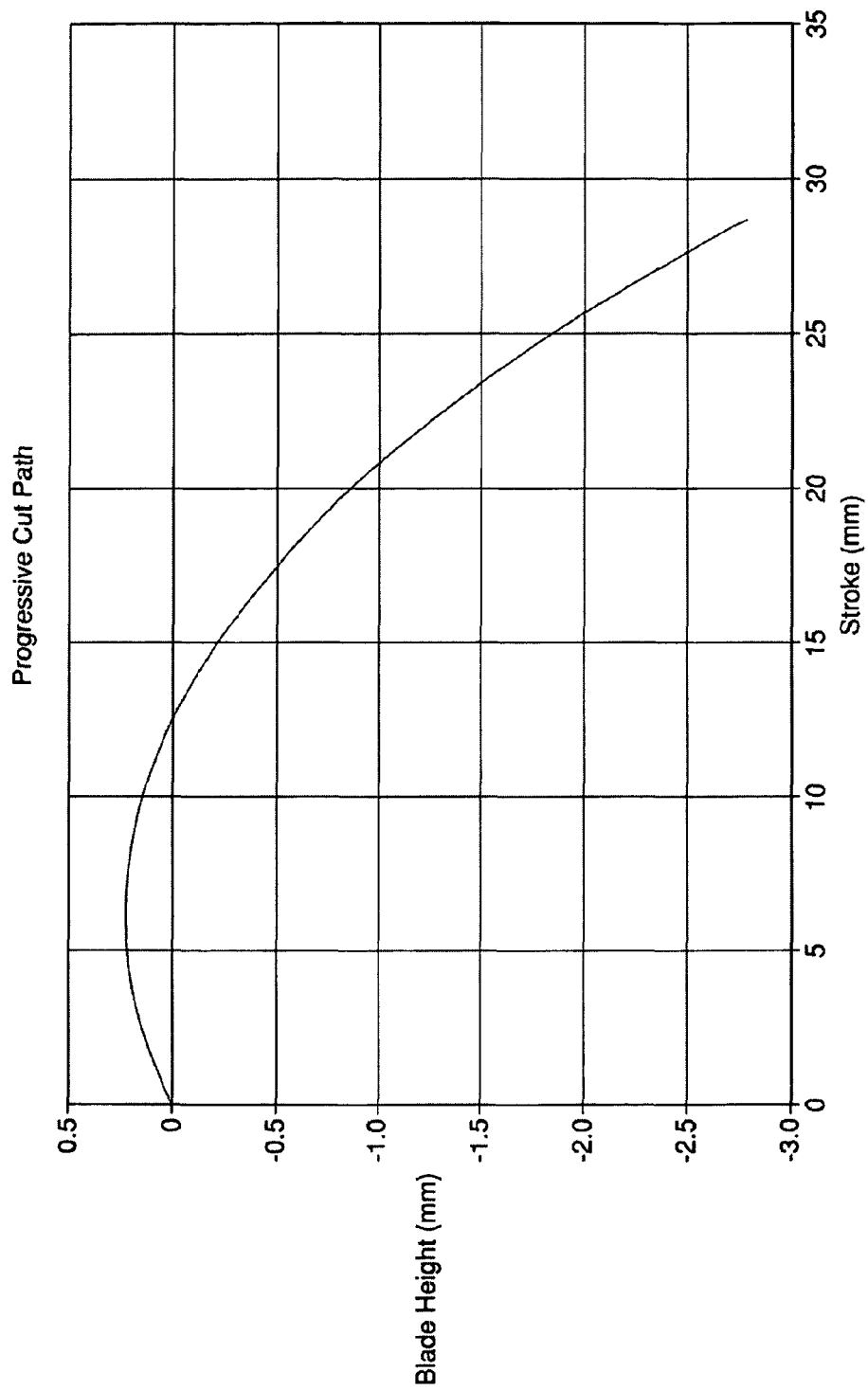
FIG. 9 is a chart of the nonlinear movement of the blade attached to the preferred embodiment of the present invention as it moves through its cutting stroke.

Since it moves through the path of movement as shown in FIG. 9, it is evident that it does not exhibit an orbital path of movement, but one that is nonlinear and progressive. The degree of progressiveness can be changed by the geometry of the mechanism. More particularly, if it is desired to have a less progressive cut, i.e., one which has a shallower path, such as moving from 0 through −1 millimeters, for example, this can be achieved by increasing the length of the rocker 110 so that the lower pivot point C is below the pivot point A of the wobble plate drive assembly. This can be done by modifying the configuration of the housing to lower the lower pivot connection 112.

It should also be understood that with the left-most position shown in FIG. 3 where the rocker is past top dead center, movement during the cutting stroke will cause the blade to lift relative to the initial rest position which will tend to counter the force of gravity that may otherwise result in bouncing of the blade off of the material being cut. It should be understood that changing the orientation of the lower pivot connection 112 more forwardly relative to the upper pivot connection 114 would enable the arc to start at top dead center and therefore not have the lifting characteristic as shown in FIG. 9. In that event, zero would be the start point and the blade height would generally extend downwardly in a curved manner with the amount of curvature being a function of the relative lengths of the rocker 110.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the following claims.

What is claimed is:

1. A drive apparatus for a reciprocating tool, comprising;
    a housing;
    a rotatable drive shaft assembly located in said housing;
    an elongated plunger located in said housing for reciprocating motion, said plunger having a front end portion for attaching a cutting blade thereto;
    a rotary joint elongated rocker having a lower end portion with a stationary lower pivot connection to said housing and an upper end with a reciprocating upper pivot connection to a mid portion of said plunger wherein said lower pivot connection and said upper pivot connection of said rocker align along a longitudinal center line of said rocker;
    a wobble plate interface operatively connected to said drive shaft assembly, a lower portion having an effective lower pivot connection, said interface also having an upper pivot connection to a rear portion of said plunger and configured to reciprocate said plunger generally in a lengthwise direction of said plunger during alternating cutting stroke and a return stroke;
    wherein distances between said upper and lower pivot connections of both said rocker and wobble plate interface together with a distance between said upper pivot connections thereof producing a path of movement of an attached cutting blade that is effective to apply a progressive non-linear cutting force to a workpiece during said cutting stroke.

2. A drive apparatus as defined in claim 1 wherein said progressive non-linear cutting force increases during said cutting stroke.

3. A drive apparatus as defined in claim 1 wherein said cutting stroke occurs when said blade is moved toward a rear of said housing.

4. A drive apparatus as defined in claim 1 wherein said path of movement that applies said progressive non-linear cutting force comprises an initial cutting stroke interval of movement where a minimal contact force is applied, followed by mid-stroke interval of movement with less than a maximum contact force is applied, followed by an end-stroke interval of movement when a maximum contact force is applied.

5. A drive apparatus as defined in claim 4 wherein said mid-stroke interval of movement is when approximately ⅓ of said maximum contact force is applied.

6. A drive apparatus as defined in claim 4 wherein said minimal contact force is approximately zero.

7. A drive apparatus as defined in claim 1 wherein said plunger moves along the same path during said return stroke as said plunger moved during said cutting stroke.

8. A drive apparatus as defined in claim 4 wherein the maximum contact force is increased when the distance between said upper and lower pivot connections of said rocker is greater than said upper and lower pivot connections of and wobble plate interface.

9. A drive apparatus as defined in claim 1 wherein an attached blade moves transversely relative to the longitudinal direction of the blade a maximum distance of about 3 millimeters when the blade is traversed through a cutting stroke distance of about 30 millimeters.

10. A drive apparatus as defined in claim 1 wherein said pivot connection between said plunger and said rocker comprises a first shaft that extends outwardly from opposite sides of said plunger and is journaled in said rocker.

11. A drive apparatus as defined in claim 10 wherein said pivot connection between said rocker and said housing comprises a second shaft that is journaled in a recess in said housing and said rocker.

12. A drive apparatus as defined in claim 10 wherein said first and second shafts are parallel to one another and perpendicular to the plane of an attached blade.

\* \* \* \* \*